United States Patent
Silverman et al.

(10) Patent No.: US 9,260,847 B2
(45) Date of Patent: Feb. 16, 2016

(54) BALL TYPE CLAMP ASSEMBLY

(71) Applicant: General Wire Spring Company, McKees Rock, PA (US)

(72) Inventors: Michael M. Silverman, Pittsburg, PA (US); Paul Korvick, Pittsburgh, PA (US)

(73) Assignee: General Wire Spring Company, McKees Rocks, PA (US)

( * ) Notice: Subject to any disclaimer, the term of this patent is extended or adjusted under 35 U.S.C. 154(b) by 300 days.

(21) Appl. No.: 13/766,421

(22) Filed: Feb. 13, 2013

(65) Prior Publication Data

US 2014/0223679 A1    Aug. 14, 2014

(51) Int. Cl.
*E03C 1/302* (2006.01)
*E03F 9/00* (2006.01)
*F16B 2/14* (2006.01)

(52) U.S. Cl.
CPC .......... *E03C 1/302* (2013.01); *E03F 9/005* (2013.01); *F16B 2/14* (2013.01); *Y10T 24/44009* (2015.01); *Y10T 29/49428* (2015.01)

(58) Field of Classification Search
CPC ..... B08B 9/045; E03F 9/005; Y10T 464/901; Y10T 24/44009; Y10T 29/49428; F16B 2/14; F16B 2/16; E03C 1/302
See application file for complete search history.

(56) References Cited

U.S. PATENT DOCUMENTS

| 1,497,483 | A | * | 6/1924 | Callender et al. | 279/66 |
| 2,266,659 | A | * | 12/1941 | Robinson et al. | 279/37 |
| 2,467,849 | A | * | 4/1949 | O'Brien et al. | 15/104.33 |
| 3,246,354 | A | * | 4/1966 | Cooney et al. | 15/104.33 |
| 3,298,666 | A | * | 1/1967 | Prange | 254/105 |
| 4,340,988 | A | * | 7/1982 | Shames et al. | 15/104.33 |
| 5,056,178 | A | * | 10/1991 | Levine | 15/104.33 |
| 6,618,892 | B2 | * | 9/2003 | Schmitt | 15/104.33 |

* cited by examiner

*Primary Examiner* — Randall Chin
(74) *Attorney, Agent, or Firm* — Ference & Associates LLC

(57) ABSTRACT

Described is a drain cleaner assembly, including: a clamp knob having a central cavity therein for accommodating a drain snake; a spout having a central cavity therein for accommodating the drain snake; the spout having at least one gripper cavity therein; at least one gripper disposed in the at least one gripper cavity; the clamp knob and the spout being attached to one another and also being displaceable with respect to one another to achieve at least two orientations, the at least two orientations comprising: a first orientation wherein the clamp knob contacts the at least one gripper and forces the at least one gripper into securing contact with the drain snake; and a second orientation wherein the clamp knob permits the at least one gripper to transition within the at least one gripper cavity to be out of securing contact with the drain snake. Other aspects are described and claimed.

15 Claims, 5 Drawing Sheets

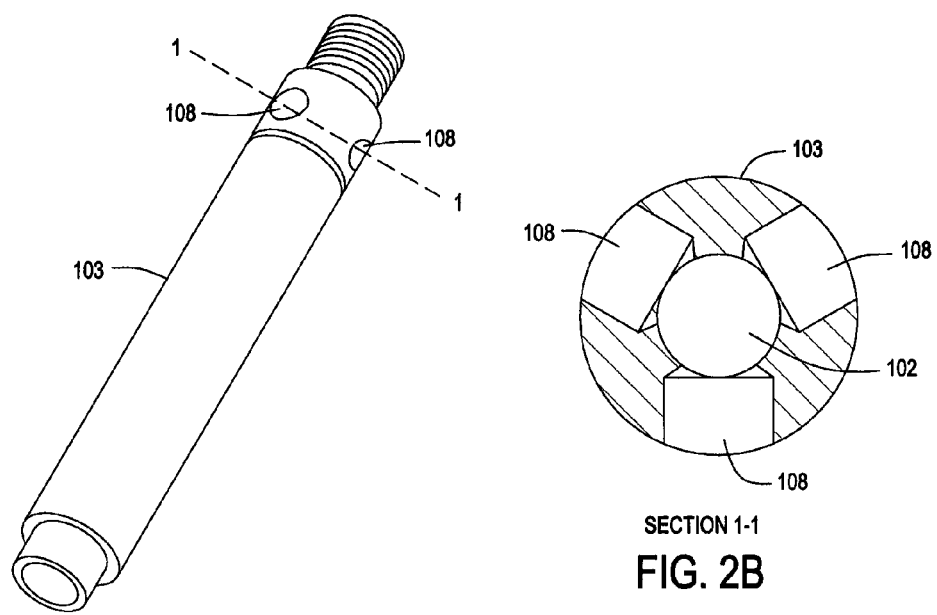

BALL TYPE CLAMP ASSEMBLY

BACKGROUND

Clamps are used to hold an element that passes through a central portion of the clamp, e.g., a drain snake for cleaning a pipe or drain. A clamp is often used to secure in place a rotating tool (such as a drain snake or other rotating element). In some applications, the element held by a clamp remains stationary with respect to the clamp assembly, which rotates with the rotating element.

Clamps employ grippers, often arranged in a radially symmetrical pattern, to hold the element securely therein. The grippers may be tightened or loosened with the help of a clamp key, which is a wrench-like tool. Some keyless clamps may be tightened and loosened by hand without the use of a clamp key. Collet clamps have grippers in the form of a collet that includes flexible "fingers" that fit closely around the element to be secured and grip the element when squeezed, bending the collet inward and in contact with the element when tightened.

BRIEF SUMMARY

In summary, one aspect provides a drain cleaner assembly, comprising: a drain snake; a clamp knob having a central cavity therein for accommodating the drain snake; a spout having a central cavity therein for accommodating the drain snake; the spout having at least one gripper cavity therein; at least one gripper disposed in the at least one gripper cavity; the clamp knob and the spout being attached to one another and also being displaceable with respect to one another to achieve at least two orientations, the at least two orientations comprising: a first orientation wherein the clamp knob contacts the at least one gripper and forces the at least one gripper into securing contact with the drain snake; and a second orientation wherein the clamp knob permits the at least one gripper to transition within the at least one gripper cavity to be out of securing contact with the drain snake.

Another aspect provides a ball type clamp assembly, comprising: a clamp knob having a central cavity therein for accommodating a rotatable element; a spout having a central cavity therein for accommodating the rotatable element; the spout having at least one gripper cavity therein; at least one gripper disposed in the at least one gripper cavity; the clamp knob and the spout being attached to one another and also being displaceable with respect to one another to achieve at least two orientations, the at least two orientations comprising: a first orientation wherein the clamp knob contacts the at least one gripper and forces the at least one gripper into securing contact with the rotatable element; and a second orientation wherein the clamp knob permits the at least one gripper to transition within the at least one gripper cavity to be out of securing contact with the rotatable element.

A further aspect provides a method, comprising: positioning a drain snake in a spout and a clamp knob, the spout having at least one gripper cavity therein with at least one gripper disposed in the at least one gripper cavity; tightening the clamp knob and the spout to achieve a first orientation wherein the clamp knob contacts the at least one gripper and forces the at least one gripper into securing contact with the drain snake; and loosening the clamp knob and the spout to achieve a second orientation wherein the clamp knob permits the at least one gripper to transition within the at least one gripper cavity to be out of securing contact with the drain snake.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 2A illustrates a view of an example spout of an example drain cleaner assembly.

FIG. 2B illustrates a cross-sectional view of the example spout of FIG. 2A along section 1-1.

DETAILED DESCRIPTION

Figure 1:
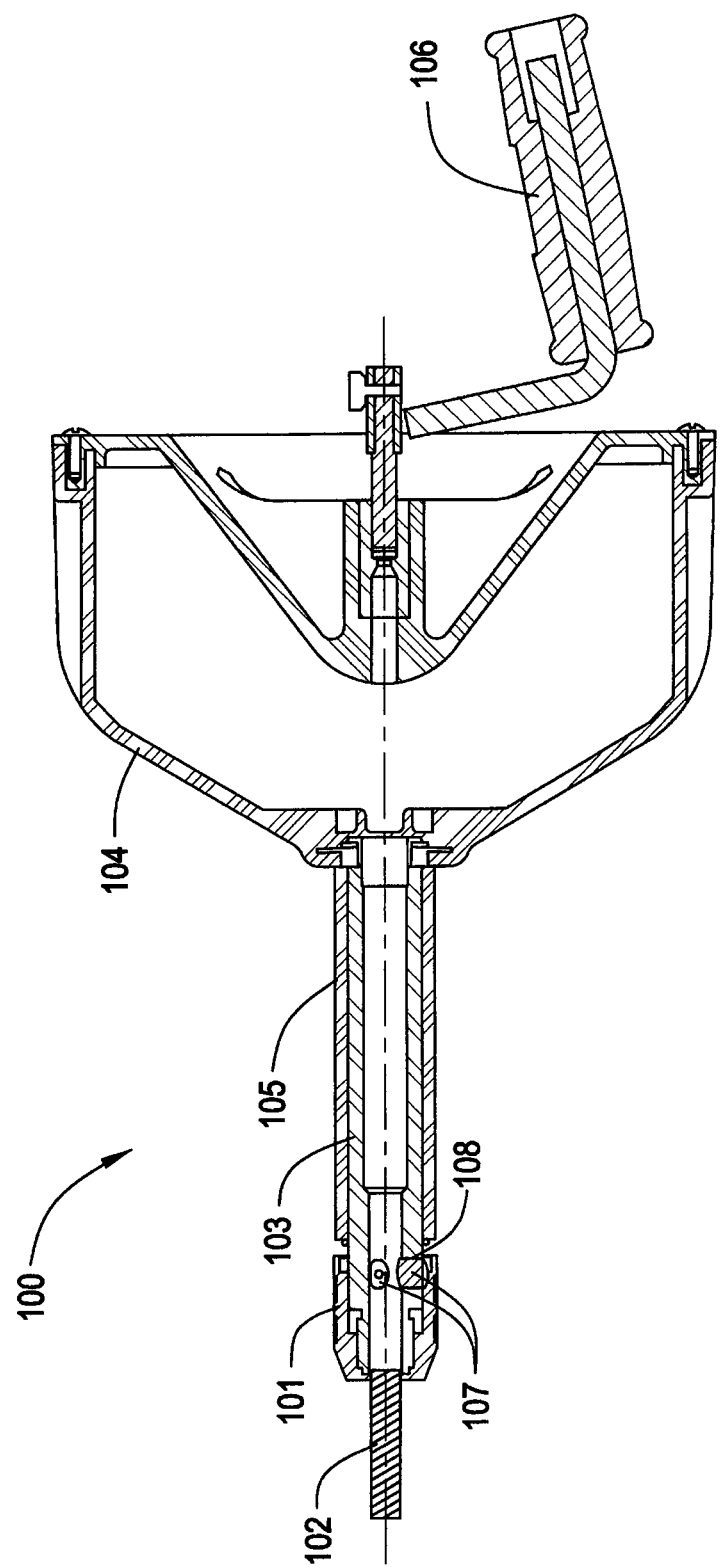
FIG. 1 illustrates a cross-sectional side view of an example drain cleaner assembly.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that various embodiments can be practiced without one or more of the specific details, or with other methods, components, materials, et cetera. In other instances, well known structures, materials, or operations are not shown or described in detail to avoid obfuscation.

Clamps, as described herein, find uses in many different assemblies. An example includes a drain cleaner assembly for cleaning pipes, for example cleaning drain pipes in plumbing applications. In such an assembly, a hand crank or motor provides rotational motion to a drain snake when the drain snake is inserted into a pipe to clear clogs in the pipe. The drain snake is generally a flexible, durable material (e.g., steel) such that the drain snake may be inserted into pipes of varying diameters and into awkward and/or tight spaces, around curves, etc. The drain snake may be long and continuous (e.g., as collected in a drum assembly) or may be sectional. The rotational motion can power the drain snake through stubborn clogs and pipe structures. Often a motor that is reversible is used to assist in releasing or retrieving the drain snake should it get caught in a pipe.

In a conventional drain cleaner assembly, a drain snake is gripped by a collet type clamp that uses "finger" like projections that are tightened or loosened (by hand or using a tool such as a thumb screw or wrench key) about the drain snake. The drain snake or cable is manually fed into the drain with the collet fingers tightened into place to lock the drain snake in place with respect to the assembly. The drain snake, when locked into place, may then be rotated in place using an electric motor or by hand crank, etc. When the collet is again loosened the drain snake may be coiled into a drum assembly provided as part of the drain cleaner assembly, although a drum assembly may be omitted, e.g., in the case of a sectional cable.

The use of a collet clamp assembly, for example as incorporated into a drain cleaner assembly, has some drawbacks. For example, the collet may tend to wear out over time, losing their spring action or even breaking. This makes clamp replacement after repeated use necessary. Moreover, the collet fingers are generally limited in their range of motion such that only a small range of drain snakes may be used with a particular collet and be adequately secured while permitting movement of the drain snake. Furthermore, a collet tends to be a complex structure, adding to cost of production and assembly.

Accordingly, an embodiment provides a ball-type clamp assembly where separate, independent gripper(s) is/(are) provided in the clamp assembly. Use of the separate, independent gripper(s) provides for increased range of gripping for accommodating a larger variety (with respect to diameter and shape) of elements to be secured, e.g., drain snakes. Moreover, the independent gripping elements resist wear and avoid unnecessary complications accompanying many other clamp assembles, e.g., collet type assemblies.

The illustrated example embodiments will be best understood by reference to the figures. The following description is intended only by way of example, and simply illustrates certain example embodiments. Any measurements supplied in the figures are in inches unless otherwise specified. All measurements and dimensions described and illustrated herein are provided as examples only.

FIG. 1 illustrates a cross sectional view of an example drain cleaner assembly 100. The drain cleaner assembly 100 includes, at one end, a clamp knob 101 through which a drain snake 102 traverses. The clamp knob 101 is movable about a spout 103, e.g., via complementary threading on each of clamp knob 101 and spout 103, although other securing mechanisms may be employed, such as components secured using a lever or spring or the like. In between clamp knob 101 and drum assembly 104, which houses drain snake 102 when retracted, sits a grip sleeve 105. The grip sleeve 105 permits an operator to grab the unit with a hand as the drum assembly 104, clamp knob 101, spout 103 and drain snake 102 rotate.

Clamp knob 101 cooperates with other components of the drain cleaner assembly 100 to secure drain snake 102 therein, as further described. The rotational motion may be provided by a hand crank 106, as illustrated in the example of FIG. 1. Other mechanisms may be used to provide rotational motion, however, such as a drill (refer to FIG. 5) or other motor attached to the drum assembly 104 in lieu of the hand crank 106.

Clamp knob 101 cooperates with spout 103 to transition independent gripper(s) 107 disposed within the spout 103 to secure the drain snake 102. Thus, when clamp knob 101 is fitted over a portion of the spout 103 in which gripper(s) 107 are disposed, gripper(s) 107 are forced to transition within cavities 108 of spout 103 to a position impinging on the drain snake 102, gripping the drain snake 102 and holding it in place.

Illustrated in the example view of FIG. 2(A-B) is an example spout 103 having cavities 108 therein for accommodating grippers 107. FIG. 2A illustrates a view of spout 103 having two cavities 108 visible. FIG. 2B illustrates a cross sectional view along section 1-1 of FIG. 2A. The cross sectional view of FIG. 2B provides an example view of three cavities 108 provided in spout 103. These cavities 108 accommodate grippers 107. Grippers 107 again move within the cavities 108 to secure an element, e.g., drain snake 102, therein. More or fewer grippers 108 may be utilized than those illustrated in the figures (e.g., one or more).

Figure 3A:
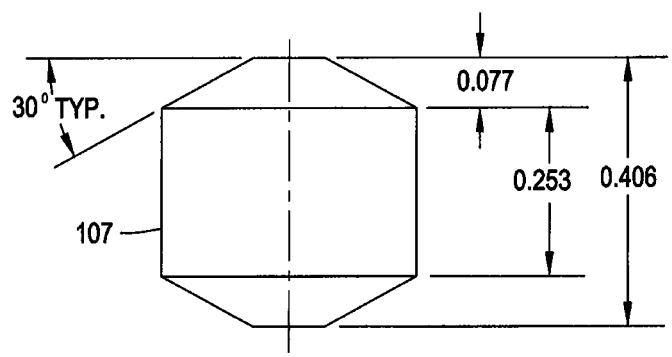
FIG. 3A illustrates a side view of an example gripper for an example drain cleaner assembly.
Figure 3B:
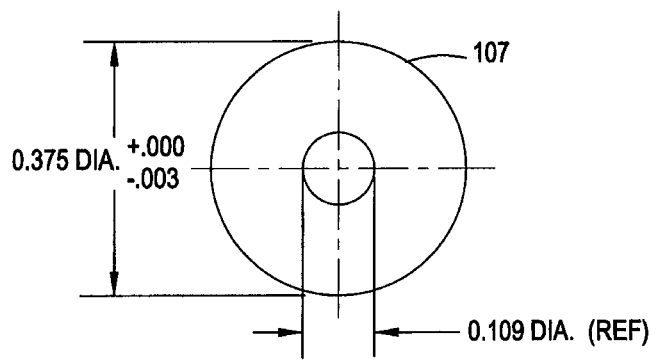
FIG. 3B illustrates a top view of the example gripper of FIG. 3A.

An example of a suitable gripper 107 is illustrated in FIG. 3(A-B). FIG. 3A provides a side view of an example gripper 107. The side view shows an example gripper 107 that has relatively straight sides and an angled top and bottom portions. This shape may find use in inhibiting movement or rotation of the gripper 107 as it sits in a cavity 108 of the spout 103. Thus, the relatively straight sides of gripper 107 interface with the cavity 108 walls in spout 103 to inhibit rotation of the gripper 107 therein. As viewed from the top, i.e., in FIG. 3B, the example gripper 107 takes a relatively circular shape, however this is only by way of example. The shape illustrated in FIG. 3(A-B) may also be useful in that the top and bottom of the shape is substantially symmetric about a central axis such that the orientation (top or bottom) in which the gripper 107 is inserted in the cavity 108 does not matter. Other suitable shapes for the gripper include, but are not limited to, a spherical or ball bearing configuration, as well as a generally oblong or ovular shape.

If a shape, e.g., a spherical or ball bearing shape or configuration, is chosen that permits the gripper 107 to rotate, e.g., as drain snake 102 rotates, the gripper may act on interfacing components, e.g., clamp knob 101, acting to loosen such components due to translation of rotational force to such interfacing components. As such, choosing a shape or configuration for gripper 107 that inhibits rotation thereof may be desirable, or, alternatively, other means for securing the components may be employed (e.g., choice of appropriate threading to counteract loosening forces supplied by gripper 107 rotation).

The gripper 107 may be supplemented with additional structure(s), and cavities 108 may be supplemented with additional structure(s), for example provided with a feature to secure gripper 107 within a cavity 108 of the spout 103. An example of an additional structure would include, but is not limited to, a ridge or outcropping that inhibits gripper 107 from falling out of a cavity 108 (in either direction), yet allows gripper to transition between tightened and loosened states by moving within cavity in response to clamp knob 101 tightening, as described herein. However, such additional structure(s) are not required, as additional mechanisms may be employed to retain grippers 107 within cavities 108, as further described herein.

Figure 4:
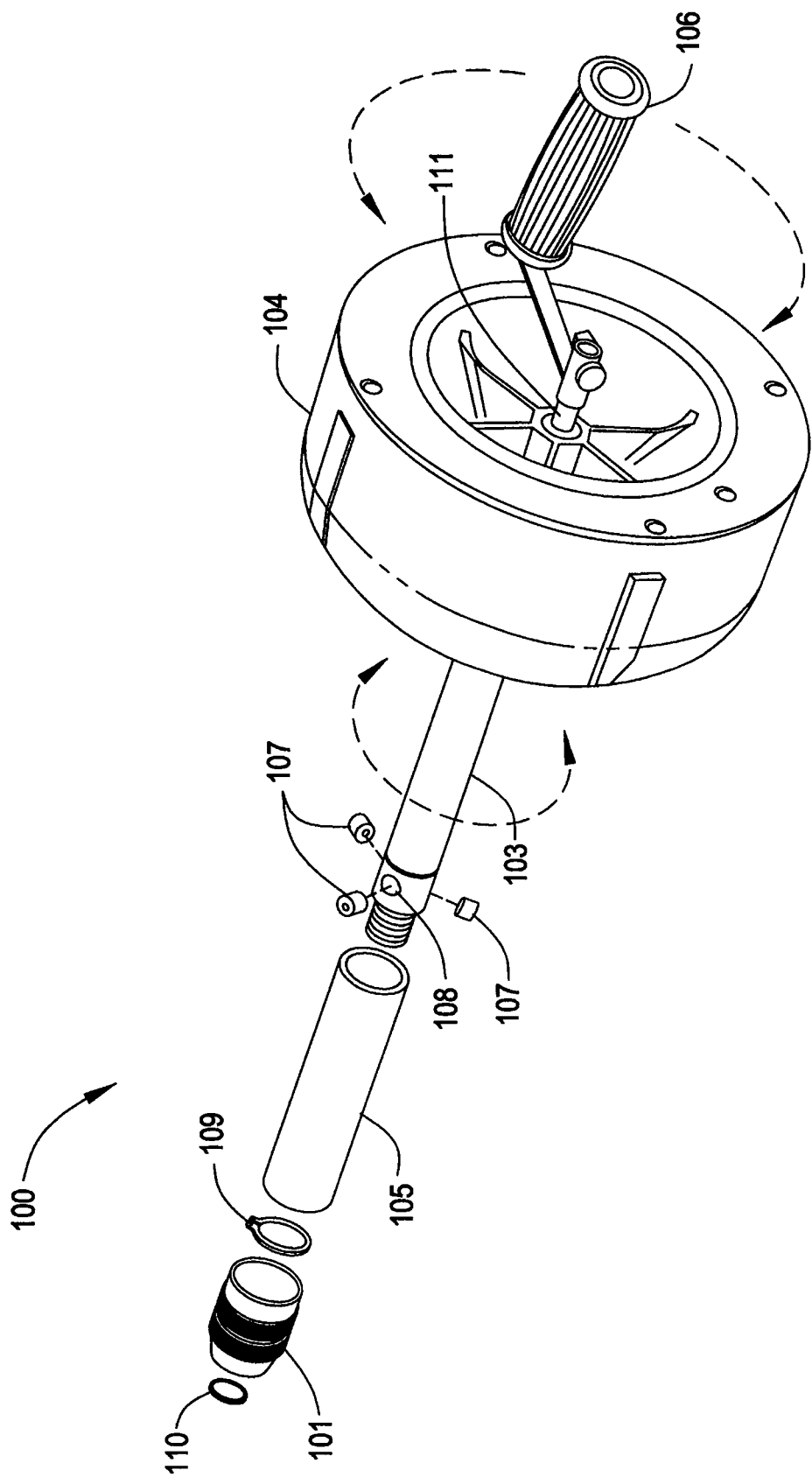
FIG. 4 illustrates an exploded, isometric view of an example drain cleaner assembly.

FIG. 4 illustrates an exploded view of an example drain cleaner assembly including an example ball type clamp assembly. In the exploded view of FIG. 4 it may be appreciated that the grip sleeve 105 fits over spout 103 and slides up to drum assembly 104 upon assembly of components of drain cleaner assembly 100 such that the grip sleeve 105 does not interfere with the portion of the spout 103 having cavities 108 therein. Thus, grip sleeve 105 is free to rotate about spout 103, e.g., when an operator rotates drum assembly 104 using hand crank assembly 106 or other rotation mechanism (as indicated by dashed arrows in FIG. 4). This allows grip sleeve 105 to remain stationary while drum assembly, 104, spout 103, clamp knob 101 and drain snake 102 (not illustrated in FIG. 4) rotate. Inclusion of grip sleeve 105 therefore facilitates hand held operation of drain cleaner assembly 100.

It may also be appreciated from the exploded view of FIG. 4 that when grip sleeve 105 is positioned over spout 103, and spout 103 portion having cavities 108 therein is unencumbered by grip sleeve 105, that positioning (tightening) of the clamp knob 101 on spout 103 will serve to retain grippers 107 in cavities 108. Moreover, by providing a clamp knob 101 that may be secured to spout 103 (e.g., via suitable threading or other securing mechanism), clamp knob 101 may act to force grippers 107 into contact with drain snake 102 upon tightening, such that drain snake 102 is secured into position by grippers 107 upon tightening clamp knob 101. Moreover, clamp knob 101 may be prevented from loosening too much, i.e., being positioned distal to the portion of spout 103 that contains cavities 108, by provisioning a securing mechanism.

A suitable securing mechanism, by way of example, is provided by a retaining ring or pin 110, which inhibits movement of clamp knob 101 distant from portion of spout 103 having cavities 108 therein such that at least a portion of the clamp knob 101 remains over and blocks gripper 107 egress from cavities 108. Other mechanisms for ensuring gripper 107 positioning within the cavities 108 are also acceptable, as described by way of example herein. Other retaining rings or pins, e.g., 109, may be provided to secure other components, e.g., grip sleeve 105. As with the clamp knob 101, other securing mechanisms may be employed to secure these components in place, such as collars, pins or the like.

Figure 5:
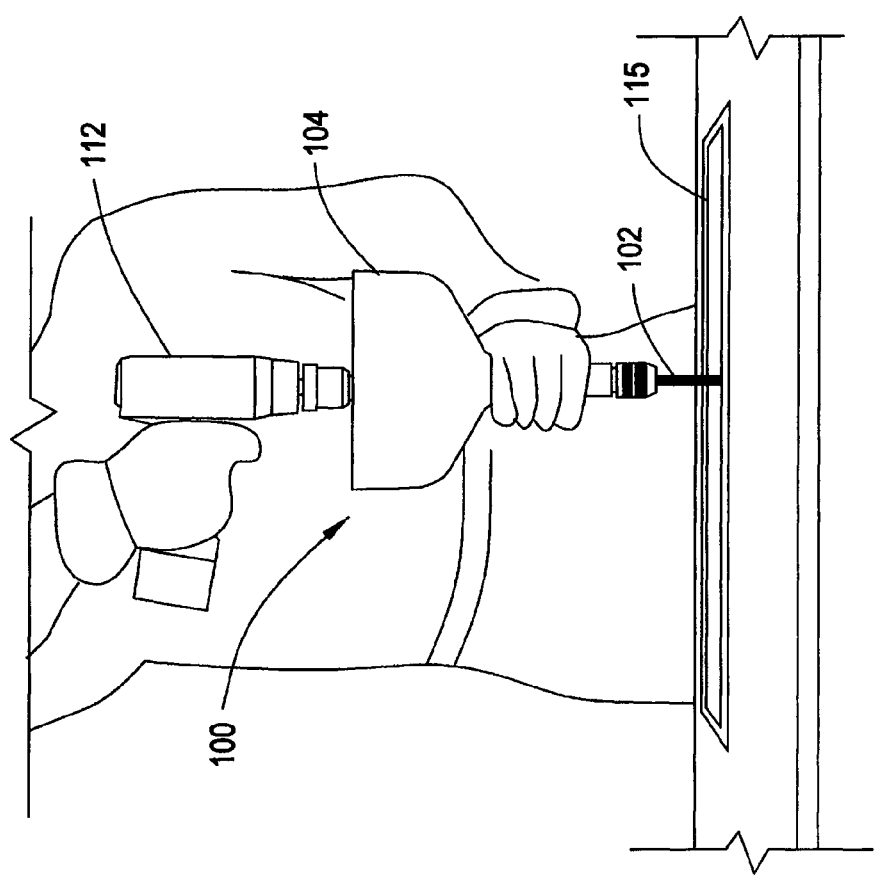
FIG. 5 illustrates a view of an example drain cleaner assembly in use.

Referring to FIG. 5, an example drain cleaner assembly 100 is illustrated. In the example illustrated in FIG. 5, an operator positions drain cleaner assembly 100 over a sink 115. The operator may grip the drain cleaner assembly 100 at a portion that remains stationary during rotating operation (e.g., at grip sleeve 105). The operator, in this example, has replaced hand crank assembly 106 with a hand drill 112 (e.g., via unscrewing hand crank assembly 106 and inserting drill fitting over a shaft element 111 attached to the drum assembly 104). The operator may turn the drum assembly 104 (e.g., using the drill 112) and in turn provide rotational motion to the spout 103, clamp knob 101, and thus the drain snake 102. The operator may extend or retrieve the drain snake 102. The clamp knob 101 may be loosened and allow the grippers 107 to transition outward within cavities 108 (with respect to drain snake 102). The drain snake may thus be extended/retracted. The drain snake 102 may be secured into position again by tightening the clamp knob 101 (e.g., via screwing it in with respect to underlying threaded spout 103), thus forcing the grippers 107 into contact with the drain snake 102.

Accordingly, an embodiment provides a ball type clamp assembly. The ball type clamp assembly may be utilized in connection with a drain cleaner assembly, as described in connection with the illustrated examples herein. However, the ball type clamp assembly may be utilized in connection with many industrial applications. For example, the ball type clamp assembly may be utilized in connection with other applications requiring reversible securing of a rotatable element.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A drain cleaner assembly, comprising:
   a drain snake;
   a clamp knob having a central cavity therein for accommodating the drain snake;
   a spout having a central cavity therein for accommodating the drain snake;
   the spout having at least one gripper cavity therein;
   at least one gripper disposed in the at least one gripper cavity, wherein the gripper is able to move freely within the at least one gripper cavity;
   the at least one gripper comprising substantially straight sides and further comprising end portions comprising a substantially flat portion positioned between angular portions, wherein the angular portions are angled with respect to: the substantially straight sides of the at least one gripper and the substantially flat portion;
   the clamp knob and the spout being attached to one another and also being displaceable with respect to one another to achieve at least two orientations, the at least two orientations comprising:
   a first orientation wherein the clamp knob contacts the at least one gripper and forces the at least one gripper into securing contact with the drain snake; and
   a second orientation wherein the clamp knob permits the at least one gripper to transition within the at least one gripper cavity to be out of securing contact with the drain snake.

2. The drain cleaner assembly of claim 1, wherein the clamp knob and the spout comprise complementary threading.

3. The drain cleaner assembly of claim 2, wherein the clamp knob and the spout displace with respect to one another to achieve the at least two orientations via rotating about the complementary threading.

4. The drain cleaner assembly of claim 1, wherein the substantially straight sides of the at least one gripper correspond to substantially straight sides of the at least one gripper cavity.

5. The drain cleaner assembly of claim 1, wherein the at least one gripper is substantially symmetric about a central axis.

6. The drain cleaner assembly of claim 1, further comprising a retaining ring disposed on the spout;
   wherein the retaining ring is positioned on the spout to inhibit removal of the clamp knob from the spout.

7. The drain cleaner assembly of claim 1, wherein:
   the at least one gripper comprises three grippers; and
   the at least one gripper cavity comprises three gripper cavities.

8. The drain cleaner assembly of claim 1, further comprising:
   a drum assembly configured to house the drain snake; and
   a shaft element configured to accommodate one or more of a hand crank and a motorized drill.

9. The drain cleaner assembly of claim 1, further comprising a drum assembly configured to house the drain snake; and
 a grip sleeve disposed on the spout, wherein the grip sleeve is located between the clamp knob and drum assembly.

10. A ball typo clamp assembly, comprising:
 a clamp knob having a central cavity therein for accommodating a rotatable element;
 a spout having a central cavity therein for accommodating the rotatable element;
 the spout having at least one gripper cavity therein;
 at least one gripper disposed in the at least one gripper cavity, wherein the at least one gripper is able to move freely within the at least one gripper cavity;
 the at least one gripper comprising substantially straight sides and further comprising end portions comprising a substantially flat portion positioned between angular portions, wherein the angular portions are angled with respect to: the substantially straight sides of the at least one gripper and the substantially flat portion;
 the clamp knob and the spout being attached to one another and also being displaceable with respect to one another to achieve at least two orientations, the at least two orientations comprising:
 a first orientation wherein the clamp knob contacts the at least one gripper and forces the at least one gripper into securing contact with the rotatable element; and
 a second orientation wherein the clamp knob permits the at least one gripper to transition within the at least one gripper cavity to be out of securing contact with the rotatable element.

11. The clamp assembly of claim 10, wherein the clamp knob and the spout comprise complementary threading.

12. The clamp assembly of claim 11, wherein the clamp knob and the spout displace with respect to one another to achieve the at least two orientations via rotating about the complementary threading.

13. The clamp assembly of claim 10, wherein the substantially straight sides of the at least one gripper correspond to substantially straight sides of the at least one gripper cavity.

14. The clamp assembly of claim 10, further comprising a retaining ring disposed on the spout;
 wherein the retaining ring is positioned on the spout to inhibit removal of the clamp knob from the spout.

15. The clamp assembly of claim 10, further comprising a grip sleeve disposed on the spout.

\* \* \* \* \*